April 12, 1960     F. WHITWORTH     2,932,198
THREE CHAMBER METER
Filed Feb. 16, 1956     4 Sheets-Sheet 2

Fig. 2

INVENTOR.
Fairchild Whitworth
BY
Johnson and Kline
ATTORNEYS

April 12, 1960 F. WHITWORTH 2,932,198
THREE CHAMBER METER
Filed Feb. 16, 1956 4 Sheets-Sheet 3
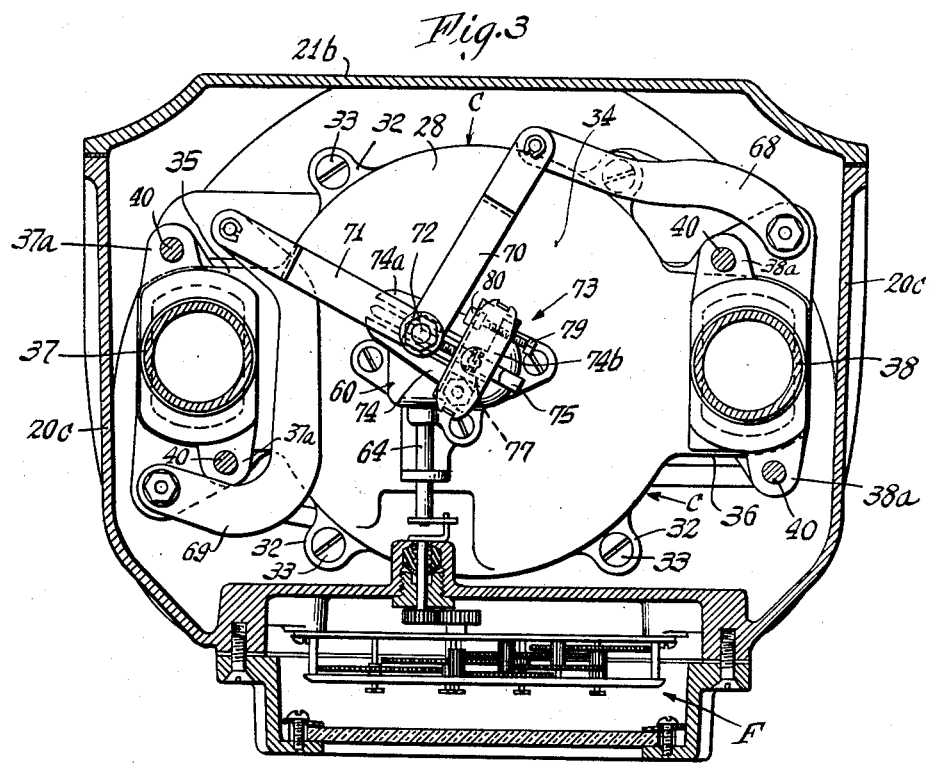
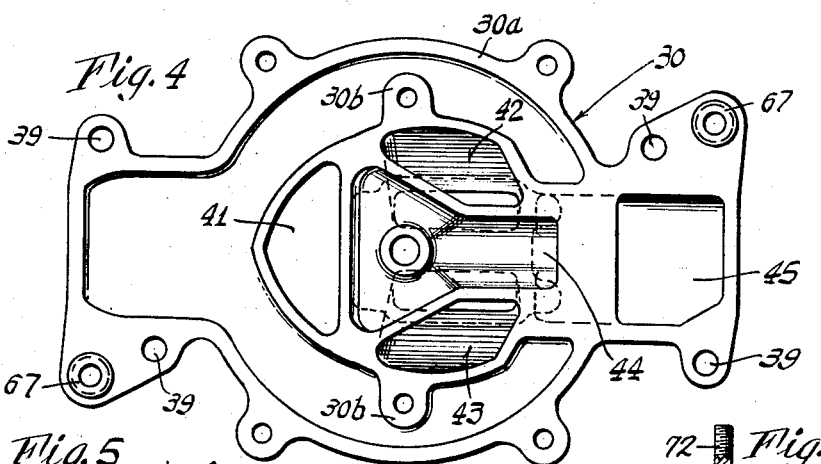
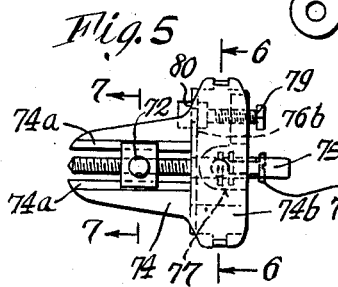
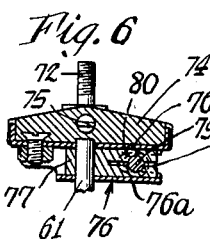
INVENTOR.
Fairchild Whitworth
BY
Johnson and Kline
ATTORNEYS April 12, 1960     F. WHITWORTH     2,932,198
THREE CHAMBER METER
Filed Feb. 16, 1956     4 Sheets-Sheet 4
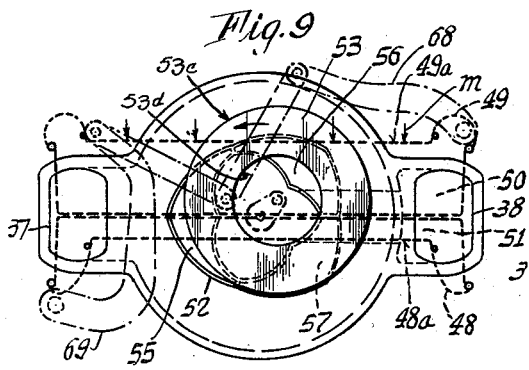
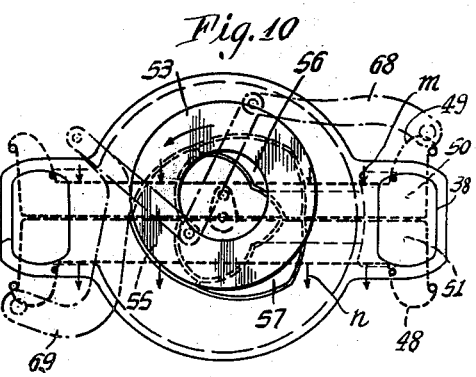
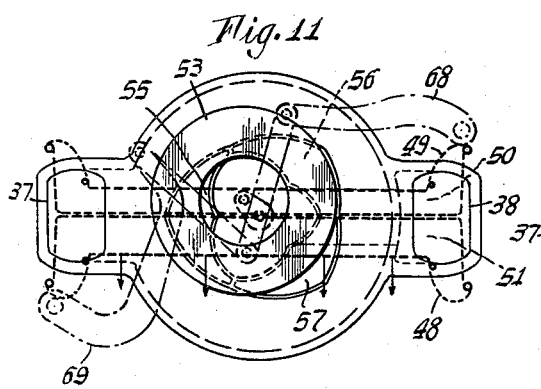
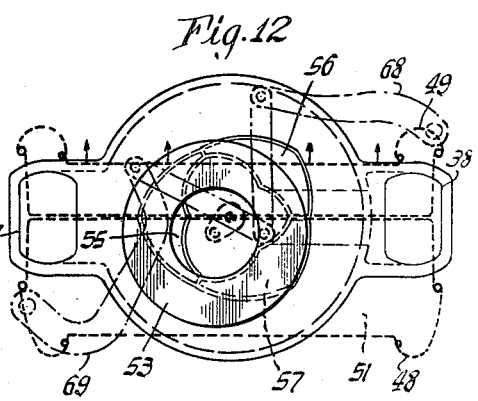
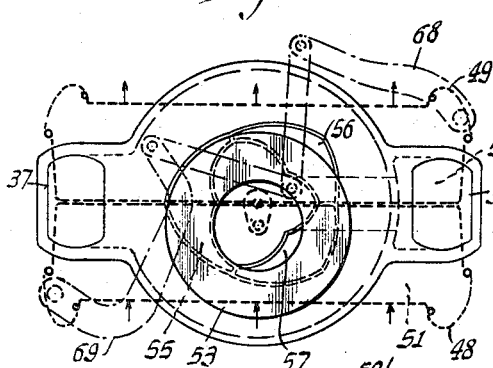
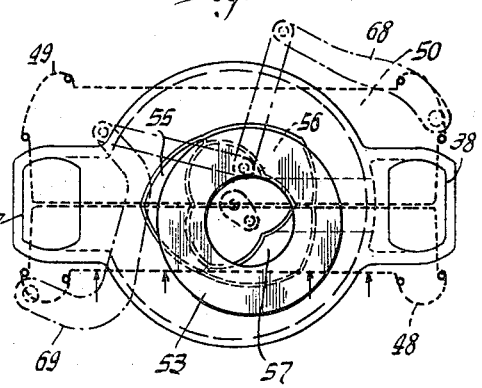
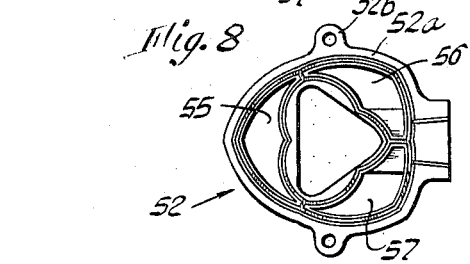
INVENTOR.
Fairchild Whitworth
BY
Johnson and Kline
ATTORNEYS

United States Patent Office 2,932,198
Patented Apr. 12, 1960

2,932,198

THREE CHAMBER METER

Fairchild Whitworth, Bridgeport, Conn., assignor to The Sprague Meter Company, Bridgeport, Conn., a corporation of Connecticut Application February 16, 1956, Serial No. 565,947

1 Claim. (Cl. 73—267)

This invention relates to gas meters and more specifically to an improved construction thereof incorporating novel features which greatly simplifies the structure, assembly, maintenance and operation of the same.

Heretofore, gas meters, particularly those of the three chamber type, required a casing which was relatively large, cumbersome and bulky, consisting generally of five component castings, namely a centerpiece, a front, a back, a top and an index box. The top casting formed the distributing chamber or gallery and contained an exposed valve, while the front, center and back components supporting a pair of diaphragms between the flanges thereof formed three separate measuring chambers, namely a front, middle and back measuring chamber. With each of the chambers and the top gallery having external exposed joints, the problem of external leakage of gas was a serious one both from the loss of gas and the danger created by the escaped gas, which problem was accentuated due to the pressure differential between the interior and exterior of the meter. Also, in four chamber meters where flagarms have been employed and which pass through a gallery wall between the measuring chambers and the sealed inlet gallery, it has required that the arms be mounted in stuffing boxes to seal the gallery from the measuring chambers. This has the disadvantage that the sealing stuffing boxes place a drag on the arms requiring more power to move them, and the continued oscillating movement of the arms tends to produce undesired leaks at the stuffing box.

Another disadvantage in the meters of the type shown in Patent No. 2,296,476 was that the main shaft of the meter required a pair of link arms for operatively connecting the diaphragms to the valve through a crank mechanism rendering the valve responsive to movement of the diaphragms. This resulted in a bulky construction with the adjusting means for the linkage being not readily accessible and enclosed entirely within the middle measuring chamber.

Further, due to the inherent structure thereof, the prior meters were relatively difficult to machine, assemble or disassemble, consequently rendering the repair and maintenance thereof equally difficult.

The present invention overcomes these disadvantages by providing a simplified meter construction having a sealed manifold assembly adapted to be connected to the inlet and outlet pipes and having a pair of measuring chambers connected thereto, said assembly being mounted within an outer casing consisting of simply a pair of complementary cover sections forming a third measuring chamber surrounding the manifold and connected measuring chambers. The third chamber is connected to the manifold which has valve means therein for sequentially connecting said chambers to the inlet and outlet ports. The valve is operated by flagarms disposed entirely within the third chamber and connected to the diaphragms of the other two chambers. With the arms disposed entirely within the third chamber, the need for a stuffing box at the pivotal mounting of the arms is eliminated and danger of leakage at this point and internal mechanical friction on the arms heretofore present is eliminated.

A feature of this invention resides in the provision of a relatively simple outer casing consisting of complementary sections, which upon the removal of one of said sections will expose the operating mechanism of the meter to facilitate assembly, disassembly, maintenance or repair. Further, the casing sections are preferably of similar construction so that they can be readily formed as a casting or produced by a simplified stamping or drawing operation.

In carrying out the present invention a novel linkage mechanism for driving the valve is provided in which the flagarms are connected by a long link to a short crank arm, thus reducing the angularity thereof so that the links push perpendicular to the arms and results in a gain in operating power.

Another advantage of the present linkage mechanism resides in the novel adjusting means whereby the means for adjusting the amount of displacement for the diaphragms and the means for adjusting the timing of the valve are disposed in the outer measuring chamber and are readily accessible for separate and individual adjustment.

Other features and advantages of the invention will be apparent from the specification and claims when considered in connection with the drawings in which:

Fig. 2 is a side sectional view in elevation of the improved gas meter construction taken along line 2—2 of Fig. 1.

Fig. 3 is a sectional plan view of the improved meter construction taken along line 3—3 of Fig. 1.

Fig. 4 is a detail plan view of the bottom plate of the valve housing.

Fig. 5 is a detail plan view of the adjusting frame and flange assembly.

Fig. 6 is a sectional view taken along line 6—6 of Fig. 5.

Fig. 7 is a sectional view taken along line 7—7 of Fig. 5.

Fig. 8 is a detail plan view of the valve seat.

Figure 1:
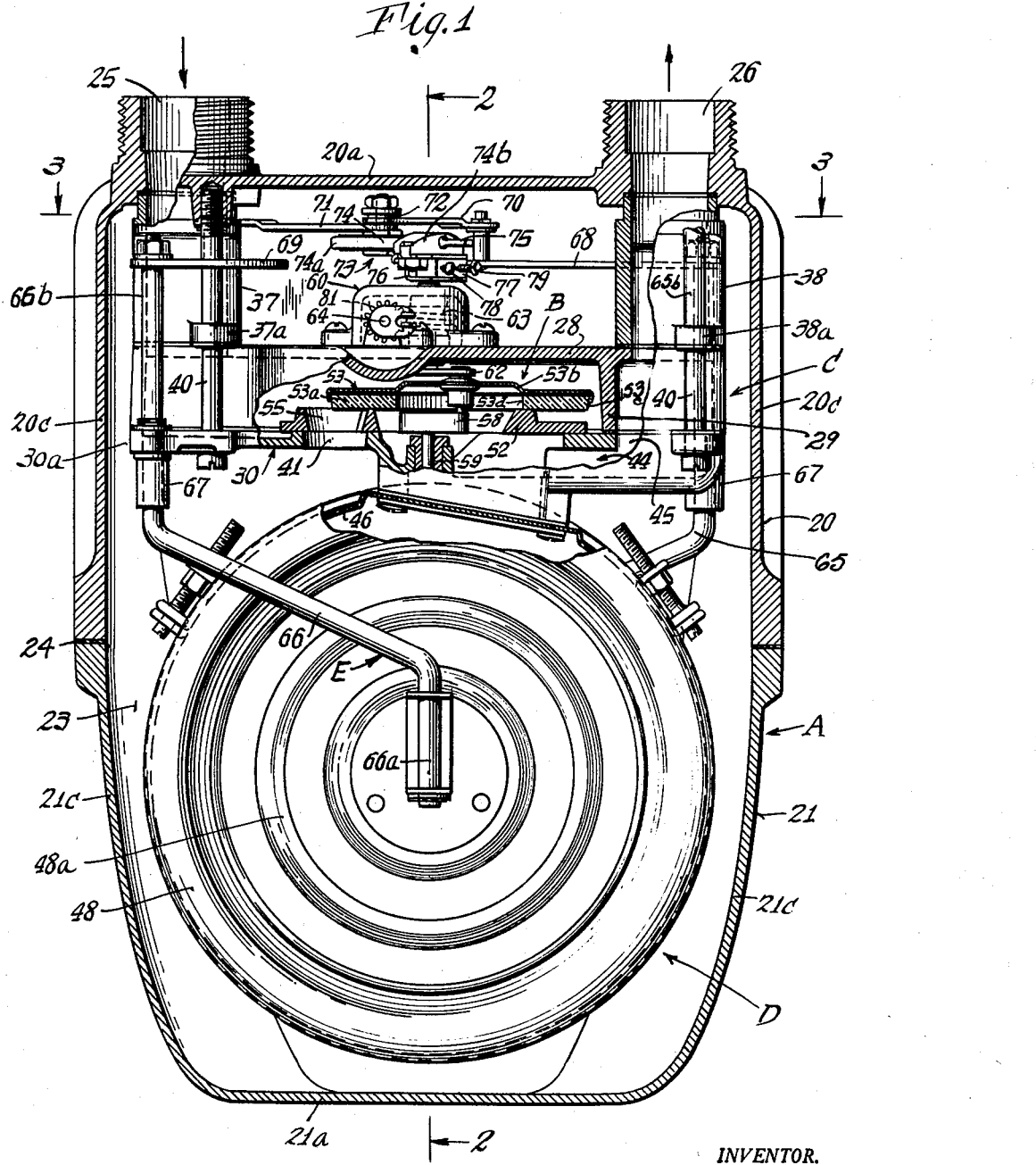
Figure 1 is a rear sectional view of the improved meter construction taken along line 1—1 of Fig. 2.

Figs. 9–14 inclusive illustrate various relative positions of the diaphragms, valve means and linkage mechanism at a particular instant during one revolution of the valve.

Fig. 9 illustrates the relative positions of the diaphragm, valve means and linkage mechanism the instant the front chamber has completed its exhaust stroke wherein the back chamber is exhausting and the outer chamber is filling.

Fig. 10 illustrates the various relative positions of the component parts wherein the outer gas chamber inlet port has closed while the back chamber is exhausting and the front chamber is filling.

Fig. 11 illustrates the relative position of the parts wherein the back chamber has completed exhausting and the outer gas chamber is in the process of exhausting while the front chamber is filling.

Fig. 12 illustrates the relative position of the parts at the half-way or mid-point of the cycle wherein the inlet port of the front chamber is closed as the back chamber is filling and the outer gas chember is exhausting.

Fig. 13 illustrates the relative position of the parts where the outer gas chember port is closed as the back chamber is filling and the front chamber is exhausting.

Fig. 14 illustrates the relative position of the parts at the instant the back chamber is closed as the outer gas chamber is filling and the front chamber is exhausting, completing one revolution of the valve.

Referring to the drawings, the improved gas meter construction of the present invention comprises an outer casing A, a valve means B sealed in a valve housing C which is spacially supported within the casing, an inner measuring means D having flexible wall portions operatively associated with the valve means and novel connecting means E connecting the flexible wall portions of the inner measuring means D to the valve means B so that the latter is rendered responsive to the movement of the flexible wall portions wherein either one or both of the flexible wall portions deliver the power for operating the valve means. If desired, an index registering means F is operatively connected with the valve means B so that the amount of gas flowing through the meter may be accurately recorded.

As it will be more fully described herein, the valve means B sealed in the valve housing C, inner gas measuring means D and connecting means E, which constitute the operating mechanism of the meter, are assembled so as to form a complete and compact unit which can be readily assembled or disassembled independently of the outer casing A. Thus, the manufacture, maintenance and repair of the meter is greatly facilitated as it will be apparent from the following description.

According to this invention, the outer casing A of the meter is substantially rectangular and is diagonally divided to form a pair of cooperating, complementary cover sections 20 and 21 which when assembled or connected together by suitable fastening means 22, such as screws or the like, forms the outer gas measuring chamber 23 of the meter, a gasket 24 being disposed between the cover section to prevent any possibility of leakage. The front cover section 20 includes the top 20a, front 20b and connecting side walls 20c, while the back cover section 21 includes the bottom 21a, back wall 21b and complementary included side wall portion 21c. Thus, it will be noted that the casing A is simply constructed of two sections which can be readily cast, stamped or drawn in which a minimum of machining is required. The top wall 20a of the meter is provided with an inlet gas opening or nipple 25 which is adapted to be connected to a source of supply (not shown) and an outlet gas opening or nipple 26 which is adapted to be connected to the device to be supplied (not shown). If desired, the front wall 20b is provided with a recess 20d adjacent to the upper portion thereof to provide a seat for the registering mechanism F, and a closure 27 cooperating therewith completes the housing for the registering means.

An important feature of the present invention is the novel arrangement and assembly of the operating mechanism within the meter casing. As illustrated in Figs. 1 and 2, the meter casing A when assembled forms the confines of the outer gas measuring chamber 23 in which the operating mechanism of the meter is spacially supported as a complete and compact unit.

The valve housing or sealed manifold C which constitutes a component part of the operating mechanism includes a top cover plate 28 having depending enclosing wall portions 29 cooperating with a bottom plate 30 to form a sealed housing for the valve means, a sealing gasket 31 being disposed between flat surfaces on the side walls of the top cover plate 28, and the bottom plate 30 to prevent leakage. As shown in Fig. 3, both top and bottom plates 28, 30 are provided with a plurality of cooperating lugs 32 for receiving screw means 33 or the like to secure the same together.

As illustrated, the valve housing C has a round central portion 34 for accommodating the valve means and diametrically opposed projecting portions 35, 36 connected thereto for receiving, respectively, a fitting or conduit 37, 38 to connect the housing C with the inlet and outlet openings 25, 26 of the casing. Thus, the valve housing is adapted to be connected to an inlet line from the source of supply and to an outlet pipe leading to a source of demand and, accordingly, the housing functions as the distributing or manifold chamber of the meter as will be hereinafter described. It will be noted that the respective conduits 37, 38 positioned between the casing A and valve housing C also function as spacers for spacially positioning the valve housing within the meter casing.

While the manifold may be secured to the casing in many ways, in the illustrated form of the invention the bottom plate 30 of the valve housing is provided with a flange 30a having a plurality of apertures 39 for receiving mounting bolts 40 by which the housing is supported to the top portion 20a of the front cover. As best seen in Figs. 1 and 3, the connecting conduits 37, 38 are also provided with ears or lugs 37a, 38a having an aperture therein cooperating with the flange apertures 39 for receiving the mounting bolts 40. Thus, it will be noted that the conduits 37, 38 are aligned with the housing and wedged between the meter casing and housing as the bolts 40 are tightened to secure the housing to the front cover, four such bolts being sufficient to secure the housing to the casing.

According to this invention, the round central portion of the housing bottom plate is provided with a plurality of openings or ports 41, 42 and 43 for rendering the valve housing in direct communication with the measuring chambers of the meter. In the instant case, three such openings are illustrated which communicate respectively with the outer measuring chamber 23 and the inner measuring means D. As shown in Fig. 1, opening or port 41 communicates directly with the chamber 23, while openings 42 and 43 communicate with the inner measuring means in a manner to be described. Disposed centrally of the openings 41, 42 and 43, the bottom plate 30 is provided with a well or passage 44 communicating with the distributing opening 45 connecting with the conduit 38 which communicates with the gas outlet opening 26.

The inner measuring means D connected to the valve housing comprises an annular body portion or ring 46 having a transversely extending imperforate partition 47 dividing the body into two equal portions. To facilitate manufacturing, this can be formed by two flat, pan shaped members placed back to back. The outer ends of the body 46 are closed by a flexible wall in the form of a diaphragm 48, 49 provided with centrally disposed diaphragm disc plates 48a, 49a. Thus, it will be noted that the inner measuring means D forms separate front and back gas measuring chambers 50, 51 respectively, which are compact, completely independent and tightly sealed to prevent any internal loss of a measured quantity of gas confined therein. Thus, as illustrated in Figs. 1 and 2, the openings 42 and 43 in the bottom plate of the housing are in direct communication with the back and front measuring chambers respectively.

In the valve housing there is positioned a valve means consisting of a valve seat 52 and a cooperating sliding valve 53 for sequentially controlling the intake and exhaust of the gas to and from respective measuring chambers. The valve seat 52, as shown in detail in Fig. 8, is provided with a flange portion 52a having apertured lugs 52b cooperating with lugs 30b of the bottom plate 30 for receiving suitable fasteners 54 for securing the valve seat thereto. As illustrated, the valve seat 52 is provided with a plurality of complementary openings 55, 56 and 57 which are adapted to be aligned with the chamber opening 41, 42 and 43 respectively of the bottom plate 30 to form therewith a passageway communicating with the respective measuring chambers 23, 50 and 51.

According to this invention, a sliding valve 53 is rotatably mounted so as to gyrate in a particular manner to cooperate with the valve seat 52 for sequentially timing the opening and closing of the passageways communicating with the respective measuring chambers. As shown in Figs. 1 and 2, the valve 53 consists of an annular ring 53a and dome cover 53b. A tangent crank 58 connected to the dome cover 53b at one end and journaled at the other end in a centrally located bearing boss 59 on the bottom plate 30 permits the sliding disc valve 53 to gyrate relative to the valve seat in a predetermined manner and, as will be hereinafter described, the valve gyrates in response to the movement of the diaphragm 48, 49. It will be noted that as the valve 53 gyrates relative to the valve seat, the annular or ring portion 53a of the valve is predeterminately positioned relative to the openings 55, 56 and 57 so that the gas entering the valve housing C through the inlet opening 25 is channeled to or from the respective measuring chamber accordingly. In Figs. 9 to 14 it will be noted that when the outer periphery 53c of the valve disc 53a is spaced from the periphery of the opening or ports 55, 56 and 57, the chamber in communication with the respective opened port receives a quantity of gas, and when the inner periphery 53d of the annular or ring portion 53a of the valve is spaced from the periphery of the respective openings, the respective chamber communicating therewith is exhausting the gas from the chamber, the gas passing into the well 44 through opening 45 in the bottom plate 30 and outwardly through conduit 38 to opening 26.

Connected to the top of the valve housing is a top bracket assembly 60 having journaled therein a rotating shaft 61 having connected thereto a link 62 to form a crank arm which is drivingly connected to the dome of the valve cover.

The shaft may be connected to the index mechanism by any suitable means. In the herein illustrated form of the invention, the shaft has secured thereto a worm 63 which drives the driven shaft 64 of the index means through gear 81. The pitch and hand of the worm is such that it normally applies a thrust in the direction of the lower bearing in the housing C for shaft 61, and presses the worm into engagement with a flat worm-engaging surface on the bearing so that the worm aids in sealing the housing from the outer chamber.

According to this invention, novel connecting means E is provided for operatively connecting the flexible diaphragms 48, 49 with the shaft 61 for driving the valve and index mechanism in response to movements of the diaphragm by the gas as it is fed into the various chambers from the manifold. This means comprises flagarm means disposed entirely within the outer chamber and pivotally carried by portions of the manifold. Since the flagarm means are wholly within the outer chamber, they no longer require stuffing boxes as was the case when they were mounted in the gallery wall. This eliminates one source of leakage as heretofore found in meters and also eliminates a source of internal mechanism friction which has been a problem in meters.

As shown in Figs. 1–3, the connecting means E are disposed exteriorly of the inner measuring means D. Consequently, it will be noted that each of the measuring chambers, namely the outer measuring chamber 23 formed by the meter casing and the back and front chambers 50 and 51 respectively, are completely sealed without the use of a packing box, thus the loss of the measured quantity of gas contained therein is prevented. As a result, the actual amount of gas ultimately displaced by the movement of the diaphragms is accurately recorded.

Accordingly, the connecting means comprises a pair of carrier wires 65, 66, also termed flagarm wires, having the lower end portion 65a, 66a thereof connected to its respective diaphragms 48, 49 and having an intermediate portion thereof journaled in a bushing 67 carried by the flange 30a of the bottom plate 30 of the valve housing. As illustrated, the journaled portions of the carrier wire are diagonally disposed relative to the housing. Connected to each of the upper ends 65b, 66b of the respective carrier wires is a flag arm 68, 69 which is shaped substantially as indicated in Fig. 3, and has connected to the outer end thereof a pitman link 70, 71 respectively. The outer ends of the links 70, 71 are connected to a common pivot 72 which is carried by a flange and frame assembly 73, the latter being connected to the rotating shaft 61. Therefore, it will be noted that as the diaphragms are moved in response to the relative gas pressure entering and exhausting the measuring chambers, the carrier wires 65, 66 oscillate in a manner whereby the respective flag arms and pitman links connected thereto cause the assembly 73 and shaft 61 to rotate. The latter being connected to the valve causes the valve to gyrate in a predeterminate manner to control the intake and exhaust of the gas to the respective chambers. According to this invention, the connecting means E and the valve assembly are so connected that the dead center of the connecting means is eliminated. Thus, as will be hereinafter described, either one or both of the diaphragms is delivering a power stroke to operate the meter.

According to this invention, the flange and frame assembly 73 connected to the shaft 61 is provided with means whereby the amount of diaphragm displacement can be simultaneously adjusted, and the timing of the valve can be adjusted independently of the former. The frame portion 74 of the assembly (see Fig. 5) comprises a T-shaped member having a bifurcated stem portion 74a. The cross arm 74b of the frame is provided with a central bore for receiving the flanged shank of the adjusting screw 75 which is adapted to be disposed between the prongs 74a of the bifurcated stem. Threaded to the screw and adjustable longitudinally thereof is the common stud or pivot 72 to which the pitman links 70, 71 are connected. Thus, it will be noted that as the adjusting screw 75 rotated, the pivot 72 will move either outwardly or inwardly relative to the longitudinal axis of the shaft 61 in accordance to the turning of the screw 75, thereby effecting an equal and simultaneous displacement of the connecting links which in turn causes the diaphragms to be displaced proportionately.

The assembly 73 includes also a channel member 76, Fig. 6, connected to the cross arm 74b of the frame, the channel having connecting means by which the assembly is adjustably fitted upon the shaft 61. Sandwiched between the flanges 76a of the channel member is a rocking lever 77, the purpose of which is to hold the channel 76 in adjusted rotative position relative to the shaft 61. A set screw 78 fixes the rocking lever or adjusting arm 77 to the shaft 61, and an adjustment screw 79 is employed to vary the rotative angular relation of the channel 76 relative to the lever 77 with respect to the axis of the shaft 61. As shown, the adjusting screw 79 is threaded into engagement with a slit friction portion 77a of the lever and a grooved spool 80, the groove being engaged by portions of the base of the channel to prevent longitudinal movement of the screw as it is rotated. As a result, the setting of the adjusting screw 79 causes an angular rotative adjustment between the lever 77 and shaft 61 connected thereto relative to the channel 76, thus effecting the proper timing of the valve 53 connected to the shaft 61. In this manner, the adjustments for displacement and valve timing controlled by adjusting screws 75 and 79 are accomplished independently of the other.

From the foregoing description, it will be seen that the valve housing C and included valve means B, front and back measuring chambers 50, 51 and connecting means E operatively connecting the diaphragms to the valve means constitute an assembled unit which is complete and compact. The unit can be readily assembled or disassembled with maximum of ease and is simply mounted to the one section of the casing only with four mounting bolts. Furthermore, the unique diagonally divided housing construction renders the operating mechanism readily accessible. By simply removing the screws or the like 22, the entire back cover portion can be removed, exposing the inner components of the meter without affecting any part of the operating mechanism.

With the relative positions of the diaphragms 48, 49, valve seat 52, valve 53 and flagarms 68, 69 as indicated in Figs. 9 to 14, the operation of the meter is as follows:

With the valve moving in a counterclockwise direction at the particular instant illustrated in Fig. 9, the front chamber 51 has just completed its exhaust stroke wherein the valve 53 has completely closed the front chamber opening 57 momentarily. At this instant of the cycle, the back chamber 50 is open and exhausting through opening 56 as the outer chamber 23 is filling through opening 55. As indicated by the arrows *m*, the diaphragm 49 of the back chamber is delivering the power to operate the meter at this instant.

As the front diaphragm 48 passes the extreme end of its exhaust stroke, i.e. its most rearward limit as viewed in Fig. 9, the valve 53 slides over opening 56 to permit the gas to flow into the front chamber 51.

As the cycle continues as illustrated in Fig. 10, the case chamber or outer chamber 23 has completed its inlet stroke and the inlet opening 55 thereto is closed. With the exhaust stroke of the outer chamber 23 about to begin as the valve continues in the counterclockwise gyration, there is at this instant of the cycle, a measured volume of gas in the case chamber 23 and no gas enters or leaves until the meter progresses in its cycle. At this moment, it will be noted, that the front chamber 51 is filling through the open port 57 as the back chamber 50 is exhausting through opening 56. In this position, as indicated by the arrows *m* and *n*, both diaphragms 48, 49 are exerting the force to operate the meter.

Fig. 11 illustrates the position of the parts at the instant the back chamber 50 has completed exhausting. As shown, the ring portion 53a of the valve completely closes the opening 56 communicating with the back chamber 50 so that no gas can enter or leave the said chamber. It will be noted that continued movement of the valve 53 counterclockwise will open the back chamber to admit the gas thereto. At this instant, the outer gas chamber 23 is still in the process of exhausting the gas through open port 55 and the front chamber 51 is filling through the partially open port 57; and, accordingly, the front diaphragm 48 is delivering the power to operate the meter.

In Fig. 12, the front diaphragm 48 has reached the extreme opposite end of its stroke and is at its most forward position. At this point, the meter has completed one-half or 180° of its complete cycle. For the moment, the inlet port 57 of the front chamber 51 is closed so that gas can neither enter nor leave the chamber 51; consequently, the front chamber contains a measured volume of gas. As shown, the back chamber 50 is filling through port 56 as the back diaphragm 49 is moving away from the center of the meter to exhaust the outer gas chamber 23, the front diaphragm being momentarily motionless. At this instant, the power to operate the meter is being delivered by the back diaphragm 49 and as the cycle continues, the front chamber 51 is about to open to exhaust the gas therein.

Fig. 13 illustrates the cycle as progressed until the case chamber or outer chamber 23 has completed its exhausting stroke. Thus, the port or opening 55 leading into the gas chamber is completely closed by the valve so that the gas can neither enter nor leave. At this point, the outer chamber 23 has displaced a measured volume of gas. As the gas opening or inlet port 55 of the outer chamber is about to open, it will be noted that the front and back diaphragms are equi-distanced from the center of the meter and both moving in the same direction toward the back thereof so that both cooperate to deliver power stroke. At this particular instant, the front chamber is exhausting through opening 57 as the back chamber is filling through the port 56. The valve movement continues until the back diaphragm reaches the end of its inlet stroke, filling the back chamber which now contains a measured volume of gas. At this instant, as shown in Fig. 14, the valve closes port 56 so that gas can neither enter nor leave the back chamber. Continuation of the valve cycle would subsequently open the exhaust port 56 of the back chamber. The front chamber continues to exhaust through port 57 as the case chamber is filling through port 55. At this point of the cycle, the front diaphragm is moved toward the center of the meter to deliver power for operating the meter. Thus, the meter has completed one complete cycle of revolution or 360° wherein each chamber has received and displaced a measured amount of gas. The sum total of these volumes equals the displacement per revolution of the meter.

Accordingly, it will be noted that the operation of the meter is relatively simple and positive in operation wherein either one or both of the diaphragms delivers the power to operate the meter during a cycle thereof. Of course it will be understood that the ratio of the worm 63 to the gear 81 of the index driving shaft 64 is determined by the displacement per revolution of the meter relative to the volume per revolution of the proving head of the index.

From the foregoing description, it will be apparent that the operating mechanism of the instant meter is greatly simplified in such a manner that greater accuracy in measuring the actual amount of gas delivered is achieved. Because of the novel construction thereof, internal loss of any portion of the measured quantities of gas within the meter is diminished and loss through external leaks which not only affect the measurements but also produce hazardous conditions are greatly reduced. Consequently, resulting errors in the meter and danger of escaped gas due to the leakage thereof is substantially eliminated.

Further, the operating mechanism of the meter produces a more compact unit and the novel casing renders the operating parts readily accessible, facilitating assembly, maintenance and repair.

Variations and modifications may be made within the scope of the claim and portions of the improvements may be used without others.

I claim:

A gas meter comprising a casing having a pair of complementary casing sections forming an outer gas measuring chamber, the top one of said sections having a gas inlet opening and a gas outlet opening, a valve housing detachably connected to said top section wherein said housing is in communication with said openings, an inner gas measuring means connected to and supported by said valve housing, said inner measuring means comprising a pair of measuring chambers, the outer wall portions of which constitute a flexible diaphragm, said valve housing being in open communication with said outer chamber and each of said inner measuring chambers, valve means enclosed within said housing for sequentially controlling the intake and exhaust of said gas to and from said measuring chambers, and actuating mechanism disposed exteriorly of said inner measuring means and carried by said valve housing for operatively interconnecting the diaphragms and the valve means so that the latter is rendered responsive to the movement of said diaphragms, said actuating mechanism including a linkage assembly comprising a carrier wire rotatably connected to the exterior side of each diaphragm, each of said wires being journaled in and entirely supported by said valve housing, a flag arm connected to each of said carrier wires and a connecting link connecting each of said flag arms to said valve means so that rectilinear movement of the diaphragms imparts a rotary movement to the valve means whereby either one or the other of said diaphragms delivers the power to operate the meter, said valve means and diaphragms cooperating to displace a measured quantity of said gas, registering means operably connected with said valve means and mounted by said casing section mounting said valve housing, said valve housing together with said inner gas measuring chambers and said actuating mechanism constituting a self-contained metering unit disconnectible as such from the gas inlet and gas outlet connections of said top casing section.

References Cited in the file of this patent

UNITED STATES PATENTS

| | | |
|---|---|---|
| 722,390 | Sprague | Mar. 10, 1903 |
| 1,238,453 | Sprague | Aug. 28, 1917 |
| 1,432,809 | Tolhurst | Oct. 24, 1922 |
| 1,583,203 | Tolhurst | May 4, 1926 |
| 1,892,827 | Brower et al. | Jan. 3, 1933 |
| 2,296,485 | Whitworth | Sept. 22, 1942 |
| 2,544,665 | Gilmore | Mar. 13, 1951 |
| 2,807,959 | Lucke et al. | Oct. 1, 1957 |
| 2,818,046 | Evans | Dec. 31, 1957 |